United States Patent Office 3,170,903
Patented Feb. 23, 1965

3,170,903
DIOLEFIN POLYMERIZATION WITH LITHIUM ADDUCT OF A POLYNUCLEAR AROMATIC HYDROCARBON
Richard S. Stearns, Malvern, Pa., assignor to The Firestone Tire & Rubber Company, Akron, Ohio, a corporation of Ohio
No Drawing. Filed Mar. 2, 1961, Ser. No. 92,779
12 Claims. (Cl. 260—94.2)

This invention relates to the polymerization of a conjugated diolefin or a mixture of a conjugated diolefin with a polymerizable ethylenically unsaturated compound free of highly negative groups to yield products in which portions of the polymer chains approach the microstructure of Hevea rubber. More particularly, when the diolefin is employed in major proportions and specifically when the diolefin is isoprene the polymerization products closely approach, in technical properties and fundamental chemical and physical properties, natural Hevea rubber.

For many important uses, natural Hevea rubber is still the most satisfactory material, notwithstanding the extensive development of synthetic diene rubbers in recent years. Hevea rubber lends itself readily to fabrication processes, having excellent tack and other manipulative properties which facilitate manufacturing operations carried out thereon. Hevea rubber yields vulcanizates which are greatly superior to other diene rubber vulcanizates in point of tensile strength (particularly when the comparison is made with non-reinforced stocks), elongation at break, and low running temperatures. These last properties have rendered Hevea rubber indispensible in large heavy duty tires such as truck and bus tires.

These superiorities of Hevea rubber over the synthetic diene polymers heretofore produced appear fundamentally to be due to the extreme regularity of the mode of polymerization of the isoprene residues in Hevea rubber, these residues being almost exclusively in the cis-1, 4-addition configuration, i.e., in units having the structural formula

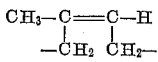

disposed along the polymer chain. Conventional synthetic diene polymers contain the diene residues in a variety of other configurations, the cis-1, 4-addition mode usually constituting less than one-third of the entire structure. It has been disclosed in British Patent No. 813,198 that carefully purified isoprene, when polymerized by the action of metallic lithium, or other lithium-dependent catalyst, yields polyisoprene having, in a large measure, the fundamental cis-1, 4-addition structure of Hevea rubber. In general, such polymers contain from 80% to 94% or more of the cis-1, 4-addition structure. The structural similarity of the polyisoprenes of the invention and Hevea rubber is reflected by comparable physical properties. For example, vulcanizates produced from the polyisoprenes of the invention are characterized by elongation at break and cool-running properties very nearly equalling those of Hevea rubber vulcanizates.

Accordingly, it is an object of this invention to provide a novel and advantageous method for the polymerization of conjugated diolefins.

Another object is to provide such a process which will result in the production of polymers having superior physical and chemical properties.

A further object is to provide a novel process for the polymerization of conjugated diolefins which will produce polymers having fundamental chemical structure and technical properties closely approaching those of Hevea rubber.

It is a specific object of the invention to provide a process for the production of substantially stereo regular cis-1, 4-polyisoprene which entails utilization as a polymerization catalyst of a lithium adduct of a polynuclear aromatic hydrocarbon.

In accordance with this invention there is provided a process of polymerizing a conjugated diolefin or a mixture thereof with a polymerizable ethylenically unsaturated compound free of highly negative groups, preferably a vinyl hydrocarbon, which comprises contacting said diolefin or said mixture with a catalyst containing as the sole essential component a lithium adduct of a polynuclear aromatic compound.

THE DIOLEFINS EMPLOYED

Diolefins suitable for use in this invention include isoprene, butadiene, piperylene, 2-methyl-1, 3-pentadiene. Isoprene is preferred. It will be understood that mixtures of diolefins indicated as being satisfactory may also be used.

The diolefins employed in this invention should be of a high degree of purity. It is desirable that the diolefin should be of more than 90 mole percent purity and preferably in the neighborhood of at least 95 percent purity. In general, the purer the diolefin, the faster the reaction rate and the closer the structure and the properties of the resulting polymer to natural rubber. Alpha acetylenes or other compounds containing reactive hydrogen, which tend to reduce the effective catalyst concentration or to act as chain-terminators, should be kept at a minimum or removed prior to use, since they use up catalyst and and also tend to lower the molecular weight of the resulting polymer. Any inhibitor normally present in a commercial diolefin must be removed by conventional techniques prior to polymerization in accordance with the invention.

Excellent polymers in accordance with the invention are produced from Pure Grade or Research Grade isoprene. Pure Grade isoprene is supplied by Phillips Petroleum Company, Bartlesville, Oklahoma and represented as having a purity of 99 mole percent and a refractive index at 20° C. of $n_D^{20}=1.422$. Research Grade isoprene is supplied by Phillips Petroleum Company and represented as having a purity of 99.6 mole percent and a refractive index at 20° C. of $n_D^{20}=1.422$. The only purification required of these monomers prior to use is removal of inhibitor therefrom. Desirable polymers in accordance with the invention are also produced from a less pure grade of isoprene obtainable from the Enjay Company Inc. which has a purity of about 91% to 93% and contains minor amounts of alpha acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to 1.4216. A final refinement which has been found particularly suitable consists in refluxing the isoprene with sodium sand or other alkali metal sand, and then distilling the isoprene away from the sand. The expression "alkali metal sand" means alkali metal that has been converted into granules of about the coarseness of sand, a form in which these metals are quite commonly used in chemical reactions.

Moisture, oxygen and other components of the atmosphere tend to use up catalyst, and to inhibit polymerization and should preferably be kept to a minimum in the reaction zone. To this end it is usually desirable that the diolefins be handled at all times in contact only with their own vapors or with atmospheres containing only their own vapors and insert gases such as helium or argon. Particularly to be avoided is the presence of compounds such as ethers, esters, amines and the like, which are sometimes considered to be indispensable constituents of alkali-metal-based catalyst systems; these compounds should be rigorously excluded from the reaction mixtures of this invention.

COMONOMERS

As noted above, in addition to being polymerized alone, the diolefins may also be copolymerized with other unsaturated compounds copolymerizable therewith. In general, it is preferred that the copolymerized compounds should constitute not over 25%, based on the total weight of the diolefin plus the copolymerized compounds, as such polymers approach closest to the properties of Hevea rubber. However, in any copolymers produced by the process of this invention from monomer mixtures containing a significant amount, say 10% or more, of a diolefin, such as isoprene, the isoprene derived portion of the polymer chain will possess a microstructure comparable to that of Hevea rubber, and the copolymers as a whole will exhibit superior physical properties distinguishing them from comparable conventionally-produced copolymers. Compounds suitable for copolymerization with diolefins in the practice of this invention include polymerizable ethylenically unsaturated compounds such as styrene, alphamethyl styrene, vinyltoluene, and the like. The copolymers should be free of ether, nitrile, nitro and other highly negative groups. It will be understood, of course, that the same standards for purity should be maintained for the comonomers as for the diolefin and solvent.

SOLVENT SYSTEMS

The process of this invention may be carried out as a mass polymerization, in which the monomeric materials are contacted with the catalyst in substantially undiluted state, or may be carried out as a solution polymerization in which the reactions are dissolved and/or dispersed in a suitable inert solvent. Any solvent to be used in the process of this invention must be a non-polar, non-acidic organic solvent. Suitable solvents include the saturated aliphatic and alicyclic hydrocarbon solvents such as the straight and branched-chain paraffins and cycloparaffins containing from 3 to 16 carbon atoms, such as propane, pentane, hexane, heptane, decane, dodecane, hexadecane, petroleum ether, straight run gasoline, cyclopentane, methylcyclopentane, cyclohexane, methyl cyclohexane and the like. The same considerations as to purity and absence of interfering compounds apply to the solvent as to the monomeric isoprene. A treatment which has been found particularly advantageous for the purification of paraffin solvents such as petroleum ether consists in agitating them with concentrated sulphuric acid, and thereafter repeatedly washing them with water. The solvents may then be dehydrated by passage through a silica gel, alumina, calcium chloride or other dehydrating and adsorbing column, and thereafter distilling. Similarly, as in the case of isoprene, the solvent after purification should preferably be handled in contact only with its own vapor or with atmospheres containing only its vapor and inert gases such as helium, argon or methane.

CATALYSTS

The catalysts contemplated by the invention comprise lithium adducts of polynuclear aromatic compounds. A relatively unfamiliar mechanism is displayed by the reaction of lithium directly with polynuclear aromatic hydrocarbons such as naphthalene, anthracene, biphenyl and the like. The reaction results in the formation of salt-like addition compounds or adducts and does not entail the replacement of hydrogen from the aromatic compounds. The formation of such compounds is described in Paul et al., JACS, 78, 116 (1956). Such lithium adducts of polynuclear aromatic compounds demonstrate relatively high conductivity in solution, and are semi-conductors in the solid isolated state. Truly, these adducts are ionic compounds. Such compounds are also characterized by a unique reaction with mercury pursuant to which the lithium becomes amalgamated with mercury and the aromatic hydrocarbon is regenerated as such. The properties in reactions of the lithium-polynuclear aromatic compound adducts of this invention are in contrast with the conventional alkyl, aryl and other hydrocarbon lithium compounds, which are normally synthesized by entirely different procedures which entail reaction of lithium metal with a halide group, whereby a lithium halide is formed, consuming a portion of the lithium metal in worthless form. In such conventional hydrocarbon lithium compounds the lithium is substituted for a hydrogen atom of the hydrocarbon. Such compounds demonstrate relatively low conductivity in solution and are non-conductive in the solid state. Conventional hydrocarbon lithium compounds react to substitute mercury for the lithium without regeneration of the hydrocarbon. The carbon lithium bond in a hydrocarbon lithium compound is essentially covalent in character.

Conventional solvents used in the formation of the lithium-aromatic hydrocarbon adducts are ethers, which would interfere with the polymerization reactions in which the catalysts of the invention are utilized. Accordingly, when ethers are used as solvents for the preparation of the adduct catalysts, such ethers are displaced from the reaction mixtures by distillation, for example, and by the addition of a hydrocarbon solvent to replace the ether. The particular methods of forming the lithium-polynuclear hydrocarbons with which the invention was concerned are known for example from the teachings of Paul et al. and form no part of the present invention.

The appropriate polynuclear aromatic hydrocarbon for the formation of the adducts useful for the catalysts in accordance with the invention include polynuclear aromatic and alkylated aromatic hydrocarbons such as biphenyl, naphthalene, anthracene, chrysene, stilbene, diphenylmethane, fluorene, naphthacene, 1-methyl naphthalene, phenanthrene, acenaphthene, pyrene, triphenylene, dibenz (a, h) anthracene, graphite, carbon black and the like. The invention in its generic conception embraces the lithium adducts of all polynuclear aromatic hydrocarbons.

POLYMERIZATION AND POLYMER RECOVERY OPERATIONS

The polymerization and polymer recovery procedures appropriate for use in conjunction with the process of the invention are conventional. Such procedures are described for example in British Patent 826,990. The catalyst is preferably utilized in an amount requisite to provide from about 0.00002 to about 0.1, preferably from about 0.0005 to about 0.004 part by weight of metallic lithium per 100 parts of monomer, particularly when isoprene is utilized. A somewhat higher catalyst concentration is preferable for the polymerization of butadiene. For example, the catalyst is appropriately utilized in an amount requisite to provide from about 0.0005 to about 0.02 part by weight of metallic lithium per 100 parts of butadiene. The catalyst concentration, however, is not critical. The polymerization is normally accomplished at a temperature between about −50° C. and 150° C., preferably between about 20° C. and about 80° C.

For small-scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane, cyclohexane and the like. An atmosphere of inert gas such as helium, argon or the like is preferably maintained in the bottle during the charging to avoid contact of oxygen with the monomer, and it will usually be desirable to complete the purging of oxygen from the system by allowing a portion of the isoprene to evaporate with the bottle loosely capped. The catalyst, which will usually be in the form of a readily flowable solution or suspension of the catalyst, is usually introduced last, just before sealing the crown cap. A hypodermic syringe is a convenient instrument for handling the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried. Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature which will usually be maintained between −50° C. and 150° C. preferably between 20° C. and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

THE POLYMER MICROSTRUCTURE

The polyisoprene synthetic rubbers produced by the invention are gel-free linear polymers of high molecular weight and usually contain about 90% cis-1,4 structure. In the copolymers and interpolymers produced in accordance with the invention the isoprene portions are typically about 90% arranged in the cis structure. Butadiene copolymerizes to provide about 90% of its units in mixed cis and trans-1,4 structure, of which about 20 to 60% is cis. The microstructures of polyisoprenes and of isoprene copolymers produced by the method of the invention are determined by the infra-red technique described in an article by J. L. Binder and H. C. Ransaw, Analytical Chemistry, volume 29, pages 503–508 (1957). The microstructures of the butadiene portions of copolymers and interpolymers containing same are determined in conformity with the technique described in J. L. Binder, Analytical Chemistry, volume 26, page 1877 (1954).

It is well known that the molecular weight of a rubbery polymer is directly proportional to its inherent viscosity. Also, the inherent viscosity of a polymer indicates its resistance to flow. Typical inherent viscosity values for commercial natural rubbers are 7.5 for smoked sheets and 10 for pale crepe rubbers.

With the foregoing general description in mind, there are given herewith detailed examples of the practice of the invention. All parts given are by weight, unless otherwise identified.

Example 1

A. PREPARATION OF CATALYST

The following ingredients were charged into a flask provided with agitator and agitated at a temperature of about 20° C. for two hours at which time the reaction mixture was blue.

| | | |
|---|---|---|
| Diethyl ether | ml | 100 |
| Naphthalene | grams | 12 |
| Lithium | do | 20 |

(35% lithium dispersion in Vaseline)

The diethyl ether was removed from the reaction mixture by reflux with n-heptane at a reduced pressure of approximately 10 cm. of mercury and at a temperature of about 50° C. The concentration of lithium in the resulting reaction product was about 0.004 gram of lithium per milliliter.

B. POLMERIZATION

The following ingredients were charged into a 6-ounce polymerization bottle previously flamed and purged with helium.

| | Ml. |
|---|---|
| Petroleum ether | 125 |
| Isoprene (Phillips Pure Grade) | 50 |
| Catalyst (as described in Section A) | 2 |

The bottle was capped and magnetic stirring by means of a magnetic stirring bar was commenced. The temperature was raised to 55° C. at which point the polymerization was immediately initiated. Upon initiation of polymerization the temperature was dropped to 25° C. and stirring was continued for about two hours until the reaction mixture became very viscous. The bottle was cut open and the polymer was washed on a wash mill and dried in a vacuum oven at 50° C. for 18 hours. The resultant polymer on infra-red analysis showed 88.5% cis 1,4-; 3.7% trans 1,4-; 0.0% 1,2-; and 7.8% 3,4- addition, the total unsaturation found being 87.2%. Butadiene, 2-methyl-1, 3-pentadiene, 2,3-dimethylbutadiene and cyclopentadiene may be polymerized by the same procedure.

Example 2

The following recipe was charged into a twelve ounce polymerization bottle and polymerized under the same conditions as described in Example 1:

| | Ml. |
|---|---|
| Petroleum ether | 225 |
| Isoprene | 75 |
| Catalyst (as described in Section A of Example 1) | 1 |

There was obtained a 90% yield of a polymer which on infra-red analysis showed 93.4% cis 1,4-; 0.0% trans 1,4-; 0.1% 1,2 and 6.5% 3,4-addition, the total unsaturation found being 84.5%.

Example 3

A. PREPARATION OF CATALYST

The following ingredients were charged into a flask provided with an agitator:

| | |
|---|---|
| Naphthalene _____grams__ | 25 |
| Diethyl ether _____ml__ | 175 |
| Lithium (34.5% dispersion in Vaseline) ___grams__ | 4.6 |

The mixture was reacted overnight in room temperature. The diethyl ether was replaced by reacting with n-heptane at a temperature of about 45–50° C. and a pressure of about 10–15 mm. of mercury. The resulting solution contained 0.0078 gram of lithium per milliliter.

B. POLYMERIZATION

The following ingredients were charged into a 12-ounce polymerization bottle which had previously been flamed and purged with helium. The bottle contained a magnetic stirring bar.

| | Ml. |
|---|---|
| Petroleum ether _____ | 225 |
| Isoprene _____ | 75 |
| Catalyst (as described in Section A) _____ | 2 |

The bottle was capped, magnetic stirring commenced, and the temperature was raised to 55° C. At the end of the induction period of about 35 to 45 minutes the polymerization initiated, and then the temperature was reduced to 25° C. Stirring was continued as long as possible. The bottle was opened and the resulting polymer was washed and dried in a vacuum oven at 50° C. for 18 hours.

The resultant polymer on infra-red analysis showed 83.1% cis 1,4-; 9.3% trans 1,4-; 0.0% 1,2-; 7.6% 3,4-addition, the total unsaturation found being 89.9%.

Comparable results are obtained when biphenyl, diphenyl stilbene, diphenylmethane or fluorene are utilized in lieu of naphthalene in the preparation of the catalyst.

In like manner, isoprene can be copolymerized with styrene and alpha methyl styrene.

Example 4

A. CATALYST PREPARATION

The following ingredients were charged into an autoclave

| | |
|---|---|
| Diphenyl _____grams__ | 30.84 |
| Lithium _____do____ | 2.776 |
| Ethyl ether _____ml__ | 125 |

The autoclave was flushed with argon and sealed. The contents were rod-milled at 25° C. for 308½ hours. The resulting brown lithium-diphenyl adduct was transferred to a 1-liter 3-neck flask and the ether was distilled in a current of argon and replaced by heptane. Excess heptane was removed by distillation to a temperature of 32° C., pot and stillhead, at 65 mm. of mercury. The final volume was 775 milliliters. The resultant product contained 0.003154 gram of lithium calculated as lithium metal, per milliliter.

B. POLYMERIZATION

The following ingredients were charged into a 6-ounce polymerization bottle, provided with a magnetic stirrer, which had previously been flamed and purged with helium.

| | |
|---|---|
| Isoprene _____ | 25 grams. |
| Catalyst (as described in Section A) _____ | 0.002 grams as metallic lithium per 100 grams isoprene. |
| Pentane _____ | 75 grams. |

The bottle was capped, magnetic stirring commenced and the temperature raised to about 50° C., which temperature was maintained for about 5 hours. A conversion of 80% was achieved. The resulting polymer was washed and then dried in a vacuum oven at 50° C. for 18 hours. The resultant polymer on infra-red analysis showed 93.5% cis 1,4-; 0.0% trans 1,4-; 0.0% 1,2- and 6.2% 3,4-addition. The total unsaturation found was 87.7%.

Example 5

A. PREPARATION OF CATALYST

The dilithium adduct of anthracene was prepared by ball milling 0.3 mol of anthracene with 0.6 gram of lithium, as a Vaseline paste in 450 milliliters of ortho-xylene for five days at room temperature.

B. POLYMERIZATION

The following ingredients were charged into a 12-ounce polymerization bottle which had been previously flamed and purged with helium. The bottle contained a magnetic stirring bar.

| | |
|---|---|
| Hexane _____ | 900 grams. |
| Butadiene-1,3 _____ | 100 grams. |
| Catalyst (as described in Section A) _____ | 0.004 gram as lithium per 100 grams butadiene-1,3. |

The bottle was capped, magnetic stirring commenced and the polymerization continued for a time period of about 40 hours at a temperature of about 50° C.

The resultant polymer, on infra-red analysis, showed 52.1% cis 1,4-; 41.1% trans 1,4-; and 6.7% 1,2-addition.

The polymers produced in accordance with the invention find application in many fields including the production of tires, adhesives, shaped rubber goods, and the like. For example, the polyisoprene rubbers produced in accordance with the invention, as exemplified above, having high cis-1,4 structure and molecular weights equalling or excelling natural rubber, can be vulcanized comparably to natural rubber to produce normal gum tensile strengths of over 3000 pounds per square inch, and carbon black reinforced vulcanizates with tensile strengths of the order of 4000 pounds per square inch. These polyisoprenes are superior to most other synthetic rubbers in that they maintain high tensile strengths at elevated temperatures. The running temperature of a typical tire tread stock of the polyisoprenes produced by the present invention is low and is equivalent to that of a natural rubber stock. Heavy duty pneumatic tires built of these polyisoprenes are equal in all important performance respects to conventional natural rubber tires, and they have a decided advantage in possessing a much greater resistance to cracking in service, as compared with natural rubber tires.

Isoprene-butadiene copolymers made by the present method are also marked by high gum rebounds and low running temperatures, as well as by a great resistance to ozone cracking of the vulcanizates. The copolymers and interpolymers of isoprene with one or more additional monomer, e.g. styrene, are also marked by the high efficiency of their vulcanizates.

It is apparent from the foregoing description that the invention provides a novel method for the polymerization of conjugated diolefins to yield products having desirable physical and chemical properties, which approach those of Hevea rubber. The process is effectively carried out in simple equipment and with relatively inexpensive starting materials.

I claim:

1. A process for the production of a rubbery polymer, comprising homopolymerizing a material selected from the group consisting of isoprene and butadiene, by contacting said material with a catalyst consisting essentially of an adduct of lithium with a polynuclear aromatic hydrocarbon compound, in the presence of a solvent for said material consisting of hydrocarbon.

2. The process of claim 1 wherein said catalyst is a lithium adduct of naphthalene.

3. The process of claim 1 in which said catalyst is a lithium adduct of biphenyl.

4. The process of claim 1 wherein said catalyst is a lithium adduct of anthracene.

5. The process of claim 1 wherein said material is butadiene.

6. The process of claim 1 wherein said material is isoprene.

7. The process of claim 1 wherein said material is butadiene, and said catalyst is utilized in an amount requisite to provide from about 0.0005 to about 0.02 part by weight metallic lithium per 100 parts by weight butadiene.

8. The process of claim 1 wherein said catalyst is utilized in an amount requisite to provide from about 0.00002 to about 0.1 part by weight of metallic lithium per 100 parts by weight of said material.

9. The process of claim 1 wherein said catalyst is utilized in an amount requisite to provide from about 0.0005 to about 0.004 part by weight of metallic lithium per 100 parts by weight of said material.

10. The process of claim 6 wherein said catalyst is the lithium adduct of naphthalene.

11. A process for the production of a rubbery polymer, comprising homopolymerizing isoprene by contacting said isoprene in the presence of an isoprene solvent consisting of hydrocarbon with a catalyst consisting essentially of an adduct of lithium and naphthalene at a temperature in the range of from about 0° C. to about 150° C., said adduct being utilized in an amount sufficient to provide from about 0.00002 to about 0.1 part by weight of metallic lithium per 100 parts by weight of isoprene.

12. A process for the production of a rubbery polymer, comprising homopolymerizing butadiene by contacting said butadiene in the presence of a butadiene solvent consisting of hydrocarbon with a catalyst consisting essentially of a lithium adduct of anthracene.

References Cited by the Examiner

UNITED STATES PATENTS

| 2,146,447 | 2/39 | Scott | 260—94.2 |
| 3,041,312 | 6/62 | Boyd | 260—94.2 |

FOREIGN PATENTS

| 218,149 | 8/58 | Australia. |
| 817,695 | 8/59 | Great Britain. |
| 223,817 | 9/59 | Australia. |

OTHER REFERENCES

Stearns and Forman, Journal of Polymer Science, 41, 381–397 (1959).

JOSEPH L. SCHOFER, *Primary Examiner.*

L. H. GASTON, M. LIEBMAN, *Examiners.*